United States Patent
Sahin et al.

(10) Patent No.: US 11,647,483 B2
(45) Date of Patent: May 9, 2023

(54) DEVICES AND METHODS FOR DEVICE TO DEVICE (D2D) COMMUNICATION

(71) Applicant: Huawei Technologies Co., Ltd., Shenzhen (CN)

(72) Inventors: Taylan Sahin, Munich (DE); Mate Boban, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 17/022,751

(22) Filed: Sep. 16, 2020

(65) Prior Publication Data

US 2021/0068079 A1    Mar. 4, 2021

Related U.S. Application Data

(63) Continuation of application No. PCT/EP2018/056690, filed on Mar. 16, 2018.

(51) Int. Cl.
*H04W 72/02* (2009.01)
*H04W 72/04* (2009.01)
(Continued)

(52) U.S. Cl.
CPC ............. *H04W 72/02* (2013.01); *H04W 4/40* (2018.02); *H04W 72/048* (2013.01); *H04W 72/121* (2013.01)

(58) Field of Classification Search
CPC ......... H04W 72/02; H04W 4/40; H04W 4/46; H04W 72/048; H04W 72/121;
(Continued)

(56) References Cited

U.S. PATENT DOCUMENTS 9,723,457 B2    8/2017   Brahmi et al.
9,736,855 B2    8/2017   Zhou et al.
(Continued)

FOREIGN PATENT DOCUMENTS

CN    105407488 A  *  3/2016
CN    105764061 A     7/2016
(Continued)

OTHER PUBLICATIONS

"Resource allocation mode decision at D2D UE under eNB controllability," 3GPP TSG RAN WG1 Meeting #77, Seoul, Korea, R1-142154, pp. 1-2, 3rd Generation Partnership Project, Valbonne, France (May 19-23, 2014).
(Continued)

*Primary Examiner* — Un C Cho
*Assistant Examiner* — Lalita W Pace
(74) *Attorney, Agent, or Firm* — Leydig, Voit & Mayer, Ltd.

(57) ABSTRACT

The present disclosure relates to a user equipment that includes a communication interface configured to perform communication with one or more nearby UEs using one or more of a plurality of resources in a cellular communication network, and processing circuitry configured to operate the UE in a first mode and in a second mode. The first mode is a scheduled resource allocation mode, and the second mode is an autonomous resource selection mode or an idle mode. The processing circuitry is configured to switch from the first mode to the second mode based on a first condition relating to an out of coverage event of the UE being met and a second condition related to a further parameter being met.

26 Claims, 15 Drawing Sheets

(51) Int. Cl.
  *H04W 4/40* (2018.01)
  *H04W 72/121* (2023.01)
(58) Field of Classification Search
  CPC ............. H04W 72/085; H04W 72/042; H04W 72/0486; H04W 72/08; H04W 72/1226; H04W 72/1231
  See application file for complete search history.

(56) References Cited

U.S. PATENT DOCUMENTS

| | | | |
|---|---|---|---|
| 2015/0201392 | A1 | 7/2015 | Sartori et al. |
| 2015/0215981 | A1 | 7/2015 | Patil et al. |
| 2015/0245334 | A1 | 8/2015 | Chang |
| 2015/0271861 | A1 | 9/2015 | Li et al. |
| 2015/0327314 | A1 | 11/2015 | Liu et al. |
| 2016/0219620 | A1 | 7/2016 | Lee et al. |
| 2016/0242152 | A1 | 8/2016 | Yu et al. |
| 2016/0295624 | A1 | 10/2016 | Novlan et al. |
| 2016/0374135 | A1 | 12/2016 | Martin |
| 2017/0238321 | A1 | 8/2017 | Sartori et al. |
| 2017/0257803 | A1 | 9/2017 | Tenny et al. |
| 2017/0289733 | A1 | 10/2017 | Rajagopal et al. |
| 2017/0289874 | A1 | 10/2017 | Li et al. |
| 2017/0303238 | A1 | 10/2017 | Fodor et al. |
| 2018/0368191 | A1* | 12/2018 | Vutukuri ............... H04W 56/00 |
| 2019/0261216 | A1* | 8/2019 | Lee ................... H04W 72/0406 |
| 2019/0394786 | A1* | 12/2019 | Parron ................ H04L 27/0006 |
| 2020/0045724 | A1* | 2/2020 | Lu ..................... H04W 72/1289 |
| 2020/0196279 | A1* | 6/2020 | Thomas ................ H04W 72/02 |
| 2020/0367113 | A1* | 11/2020 | Tang ................ H04W 72/0406 |
| 2021/0235464 | A1* | 7/2021 | Loehr ............... H04W 28/0278 |

FOREIGN PATENT DOCUMENTS

| | | |
|---|---|---|
| CN | 105934985 A | 9/2016 |
| WO | 2016119124 A1 | 8/2016 |
| WO | 2016141983 A1 | 9/2016 |
| WO | 2017011106 A1 | 1/2017 |
| WO | WO-2017027375 A1 * | 2/2017 ............ H04W 76/36 |
| WO | 2017061913 A1 | 4/2017 |
| WO | 2017078237 A1 | 5/2017 |
| WO | 2017105151 A1 | 6/2017 |
| WO | 2017148236 A1 | 9/2017 |
| WO | 2017150958 A1 | 9/2017 |
| WO | 2017157089 A1 | 9/2017 |
| WO | 2017161551 A1 | 9/2017 |
| WO | 2017166260 A1 | 10/2017 |
| WO | 2017171437 A1 | 10/2017 |
| WO | WO-2018030258 A1 * | 2/2018 |

OTHER PUBLICATIONS

"Mode Configuration and switching," 3GPP TSG-RAN WG2 Meeting #86, Seoul, Korea, R2-142584, total 5 pages, 3rd Generation Partnership Project, Valbonne, France (May 12-16, 2014).
Molina-Masegosa et al., "LTE-V for Sidelink 5G V2X Vehicular Communications: A New 5G Technology for Short-Range Vehicle-to-Everything Communications," IEEE Vehicular Technology Magazine, vol. 12, Issue 4, total 10 pages (Dec. 2017).
"Sharing Resource Pool for eNB-Controlled and UE-Autonomous V2V Transmission Modes," 3GPP TSG RAN WG1 Meeting #91, Reno, USA, R1-1720037, pp. 1-5, 3rd Generation Partnership Project, Valbonne, 3rd Generation Partnership Project, Valbonne, France (Nov. 27-Dec. 1, 2017).
"Resource pool sharing between mode 3 and 4," 3GPP TSG RAN WG2 Meeting #99bis, Prague, Czech Republic, R2-1710652 (Revision of R2-1709049), pp. 1-4, 3rd Generation Partnership Project, Valbonne, France (Oct. 9-13, 2017).
"3rd Generation Partnership Project; Technical Specification Group Radio Access Network; NR; NR and NG-RAN Overall Description; Stage 2 (Release 15)," 3GPP TS 38.300 V15.0.0, total 68 pages, 3rd Generation Partnership Project, Valbonne, France (Dec. 2017).
"3rd Generation Partnership Project; Technical Specification Group Radio Access Network; NR; Medium Access Control (MAC) protocol specification (Release 15)," 3GPP TS 38.321 V15.0.0, total 55 pages, 3rd Generation Partnership Project, Valbonne, France (Dec. 2017).
"3rd Generation Partnership Project; Technical Specification Group Radio Access Network NR Radio Resource Control (RRC) protocol specification (Release 15)," 3GPP TS 38.331 V15.0.0, total 188 pages, 3rd Generation Partnership Project, Valbonne, France (Dec. 2017).
"3rd Generation Partnership Project; Technical Specification Group Radio Access Network; Evolved Universal Terrestrial Radio Access (E-UTRA); User Equipment (UE) radio transmission and reception (Release 15)," 3GPP TS 36.101 V15.1.0, total 1636 pages, 3rd Generation Partnership Project, Valbonne, France (Dec. 2017).
"3rd Generation Partnership Project; Technical Specification Group Radio Access Network; Evolved Universal Terrestrial Radio Access (E-UTRA); Multiplexing and channel coding (Release 15)," 3GPP TS 36.212 V15.0.1, total 214 pages, 3rd Generation Partnership Project, Valbonne, France (Jan. 2018).
"3rd Generation Partnership Project; Technical Specification Group Radio Access Network; Evolved Universal Terrestrial Radio Access (E-UTRA); Physical layer procedures (Release 15)," 3GPP TS 36.213 V15.0.0, total 493 pages, 3rd Generation Partnership Project, Valbonne, France (Dec. 2017).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.0.0, total 338 pages, 3rd Generation Partnership Project, Valbonne, France (Dec. 2017).
"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.0.0, pp. 1-109, 3rd Generation Partnership Project, Valbonne, France (Dec. 2017).
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.0.1, total 776 pages, 3rd Generation Partnership Project, Valbonne, France (Jan. 2018).
"UE procedure after sensing in UE autonomous resource selection," 3GPP TSG RAN WG1 Meeting #85, Nanjing, R1-164759, Total 10 pages 3rd Generation Partnership Project, Valbonne, France (May 23-27, 2016).

* cited by examiner

```
SPS-ConfigSL-r14 ::=    SEQUENCE {
    sps-ConfigIndex-r14         SPS-ConfigIndex-r14,
    semiPersistSchedIntervalSL-r14   ENUMERATED {
                                        sf20, sf50, sf100, sf200, sf300, sf400,
                                        sf500, sf600, sf700, sf800, sf900, sf1000,
                                        spare4, spare3, spare2, spare1)
}
```

DEVICES AND METHODS FOR DEVICE TO DEVICE (D2D) COMMUNICATION

CROSS-REFERENCE TO RELATED APPLICATIONS

This application is a continuation of International Patent Application PCT/EP2018/056690, filed on Mar. 16, 2018, the disclosure of which is hereby referenced in its entirety.

TECHNICAL FIELD

In general, the present disclosure relates to the field of wireless communications. More specifically, the present disclosure relates to devices and methods for device-to-device (D2D) communication in a wireless communication network, and in particular, to a user equipment (UE) for D2D communication, a network entity for allocating D2D communication resources, and corresponding methods.

BACKGROUND

A user equipment (UE) supporting device-to-device (D2D), in particular vehicle-to-vehicle (V2V) communication can operate in two modes for sidelink radio resource allocation. In a first mode, known as "scheduled resource allocation", a UE requests transmission radio resources from a base station, and the base station allocates dedicated transmission radio resources to the UE. In a second mode, known as "UE autonomous resource selection", the UE on its own selects radio resources from preconfigured resource pools. The scheduled resource allocation mode can be, for instance, a 3GPP LTE-A mode 3, and the autonomous resource selection mode can be, for instance, a 3GPP LTE-A mode 4, which are described in 3GPP standard TS 36.213 V15.0.0 (2017-12).

The situations in which users are out of coverage (OOC) of the cellular network arise in early stages of network deployments or may exist due to obstacles (e.g., a road tunnel or a topology condition creating severe fading) in any stage of network deployments. The OOC situations may occur over space, time, and frequency and may be static or dynamic. Furthermore, the OOC may be expected (known) or unexpected (unknown) and may be limited by the network infrastructure from different sides.

Out-of-coverage V2V communications are supported by the 3GPP standard LTE-A Release 14 (see 3GPP TS 36.300, 3GPP TS 36.331, 3GPP TS 36.32, 3GPP TS 36.212 and 3GPP TS 36.101) by allowing users to autonomously select radio resources for transmitting V2V data and control information based on a sensing mechanism when they are out-of-coverage, from a resource pool pre-configured by the network. This mode of operation is referred to as "Mode 4" in the standard. Pre-configured pools can be optionally mapped to geographical zones by the network, where the users select the pool according to its location, i.e., its zone.

However, the OOC case is not exhaustively tackled in the 3GPP standard: users are only allowed to make autonomous resource selection, which is not collision-free as opposed to in-coverage mode of operation for V2V. This has a negative impact on the reliability of the transmissions.

Moreover, the pools can only be semi-statically pre-configured by the network, which may easily result in resource usage inefficiency, i.e., under- or over-utilization of the radio resources. As OOC resource pools are not allowed to overlap with the in-coverage pools, this limits the size of the OOC resources.

Mapping of the OOC resource pools to zones is done very coarsely, allowing the zones to be defined only as equal-sized, rectangular/square-shaped geographical areas, which may again easily result in radio resource usage inefficiency, as the road and communication traffic of the vehicles are heterogeneously distributed over space and time.

Furthermore, characteristics of OOC areas (e.g., boundaries, durations) cannot be well reflected on the pre-configuration of the resource pools. Therefore, the OOC mode of operation defined by the state-of-art standard is not the optimum solution for resource allocation and can be improved in many ways.

In light of the above, there is a need for improved devices and methods for D2D communication, allowing allocating radio resources and transmitting data for D2D communication in a reliable and efficient manner.

SUMMARY

The present disclosure describes improved devices and methods for D2D communication that allow for allocating radio resources and transmitting data for D2D communication in a reliable and efficient manner.

Generally, embodiments of the disclosure relate to a user equipment (UE) for a wireless communication network and to a network entity such as a base station, as well as to corresponding methods for allocating radio resources and transmitting data for D2D communication in a reliable and efficient manner. More specifically, embodiments of the present disclosure can exploit radio resource management control by the network infrastructure in coverage, to increase the reliability and efficiency of radio resource utilization for out-of-coverage (OOC) events, i.e. when the users are out of coverage of the cellular network (e.g., a base station).

According to embodiments of the disclosure, the users, i.e. user equipments, can keep using their latest resource allocations in coverage of the cellular network also when the users are out of coverage in a way configured and signaled by a base station, which is herein also referred to as "Extended Mode 3". Furthermore, embodiments of the disclosure can operate the Extended Mode 3 in parallel and/or through interaction with Mode 4 operation in OOC situations, and improve the OOC Mode 4 resource allocation and selection procedures. Finally, user equipments can provide information about OOC events or situations to the base station when they are back in coverage, so as to assist them for better resource allocation during OOC events, i.e. when the users are out of coverage.

Embodiments of the disclosure provide a key advantage of increasing the reliability efficiency of resource utilization performance of D2D, in particular V2V, communications under OOC situations by exploiting in-coverage radio resource management control provided via the network entity and better performance than exclusive OOC mode of operation of users, defined by current D2D communication standards.

More specifically, according to a first aspect, the disclosure relates to a user equipment (UE) which comprises: a communication interface configured to perform communication with one or more nearby UEs using one or more of a plurality of resources in a cellular communication network; and a processing unit configured to operate the UE in a first mode and in a second mode, wherein the first mode is a scheduled resource allocation mode and the second mode is an autonomous resource selection mode or an idle mode and the processing unit is configured to switch from the first mode to the second mode, if a first condition relating to an out of coverage (OOC) event (also referred to as OOC status, condition or situation) of the UE is met; and a second condition related to a further parameter is met.

The UE can be configured to determine the first and/or the second condition on its own or it can be configured to receive the results of respective determinations of these conditions by another network entity, in particular a base station. If the first condition relating to an out of coverage event of the UE is met then the UE is out of coverage.

An OOC or OOC event can be defined, for instance, by one or more of the following conditions: (a) the UE has no serving cellular network, (b) the power received by the UE from the cellular network is less than a threshold value, and/or (c) the UE is not interested in performing communication on a frequency provided by the cellular network.

The scheduled resource allocation mode can comprise, for instance, a 3GPP LTE-A mode 3 and the autonomous resource selection mode can comprise, for instance, a 3GPP LTE-A mode 4, wherein the transmission modes 3 and 4 are as described in 3GPP standard TS 36.213 V15.0.0 (2017-12).

In a further possible implementation form of the first aspect, the UE further comprises a memory configured to store a plurality of operation profiles, and the processing unit is configured to, until the second condition is met, operate the UE in the first mode according to one of the plurality of operation profiles. An operation profile can define communication resources and/or a communication behaviour to be used by the UE.

In a further possible implementation form of the first aspect, the plurality of operation profiles comprises at least one operation profile used in case of an unexpected OOC event. In case of an unexpected OOC even the UE does not know of this event in advance, e.g. because it was not provided with any information, e.g. from a network entity or another UE, that the OOC will occur.

In a further possible implementation form of the first aspect, according to the operation profile, the processing unit is configured to operate the UE in the first mode by using active semi-persistent schedule (SPS) configurations and allocated resources for periodic, aperiodic and/or single transmissions, until the second condition is met.

In a further possible implementation form of the first aspect, the plurality of operation profiles comprise at least one operation profile associated with an expected OOC event. An expected OOC event is an event that the UE knows in advance, either by information from the network entity or another UE and/or by inferring this from available information, e.g. map data.

In a further possible implementation form of the first aspect, according to the operation profile associated with an expected OOC event, the processing unit is configured to operate the UE in the first mode, until the second condition is met, by using active semi-persistent schedule (SPS) configurations and/or allocated resources for periodic transmissions, by selecting one or more of a plurality of resources assigned by a network entity of the cellular communication network to be used during the expected OOC event and/or by using a one-shot schedule provided by a network entity of the cellular communication network.

In an implementation form, a one-shot schedule is a single, complete resource assignment to the UE, consisting of, e.g., different time and frequency slots, to be exclusively used starting from the time the OOC condition is met until the time the OOC condition is over.

In a further possible implementation form of the first aspect, the second mode is an autonomous resource selection mode, and the processing unit is further configured to operate the first mode in parallel with the second mode, in response to an OOC event until a second condition is met, in particular by using the first mode for periodic transmissions and the second mode for aperiodic transmissions.

In a further possible implementation form of the first aspect, the second mode is an autonomous resource selection mode, and the communication interface is configured to sense a load of the resources for the second mode and the processing unit is configured to replace a transmission on resources allocated for the first mode with a high priority transmission of the second mode, in particular in case the load of the resources for the second mode is larger than a load threshold for the second mode.

In a further possible implementation form of the first aspect, the second condition is met if one or more of the following is met: a time elapsed since the start of the OOC event is larger than a time threshold; a distance travelled by the UE since the start of the OOC event is larger than a distance threshold; the UE does not operate in the first mode with a probability defined by a network entity of the communication network; a load of the resources allocated for the first mode is larger than a predefined threshold. The UE can be configured to sense the load of the resources allocated for the first mode.

In a further possible implementation form of the first aspect, in response to an OOC event, the communication interface is configured to sense a load of the resources, in particular a channel busy ratio (CBR) value, and the processing unit is configured to record information about times and/or locations, at which the sensed load is larger than a load threshold, and/or context information of the UE, e.g., a motion state, a vehicle velocity, road conditions, et cetera, and to provide the information to a network entity of the cellular communication network. This advantageously allows the network to gather information about where OOC events occur and provide other UEs with information thereon, i.e. to optimize resource allocation for other UEs and to avoid unexpected OOC events.

In a further possible implementation form of the first aspect, the second mode is an autonomous resource selection mode, wherein, in response to an OOC event, the communication interface is configured to use downlink resources in the second mode.

In a further possible implementation form of the first aspect, the second mode is an autonomous resource selection mode, wherein in the second mode the communication interface is configured to transmit information about the number of next transmissions of the same type, e.g., media access control (MAC) protocol data units (PDUs) of the same size, belonging to the same sidelink communication process, in particular to reserve the same selected resources for that number of times on the communication interface, to other UEs.

In a further possible implementation form of the first aspect, the second mode is an autonomous resource selection mode, wherein in the second mode the communication interface is configured to: transmit the information of the number of next transmissions to other UEs, in case the number is smaller than a threshold value, in particular a threshold value provided by a network entity of the communication network; and/or transmit a random number for the number of transmissions, in case the number is larger than the threshold value.

According to a second aspect, the disclosure relates to a corresponding method of operating a UE, wherein the UE comprises a communication interface configured to perform communication with one or more nearby UEs using one or more of a plurality of resources in a cellular communication network and a processing unit configured to operate the UE in a first mode and a second mode, wherein the first mode is a scheduled resource allocation mode and the second mode is an autonomous resource selection mode or an idle mode. The method comprises the steps of: switching from the first mode to the second mode, if a first condition relating to an out of coverage event of the UE is met; and a second condition related to a further parameter is met.

According to a third aspect, the disclosure relates to a network entity, in particular a base station, for managing communication resources in a cellular communication network, wherein the network entity is configured to communicate with a UE, wherein the UE can be operated in a first mode and in a second mode, wherein the first mode is a scheduled resource allocation mode and the second mode is an autonomous resource selection mode or an idle mode, and to provide the UE information about when to switch to the second mode, in particular based on one or more of the following conditions: a time elapsed since the start of an OOC event is larger than a time threshold; a distance traveled by the UE since the start of an OOC event is larger than a distance threshold; the UE does not operate in the first mode with a probability defined by the network entity; and/or a load of the resources allocated for the first mode is larger than a predefined threshold.

In a further possible implementation form of the third aspect, the network entity is configured to provide a plurality of operation profiles to the UE, wherein a processing unit of the UE is configured to, until the second condition is met, operate the UE in the first mode according to one of the plurality of operation profiles.

In a further possible implementation form of the third aspect, the plurality of operation profiles comprise one or more operation profiles to be used in case of an unexpected OOC event of the UE.

In a further possible implementation form of the third aspect, according to the operation profile the UE is configured to operate in the first mode by using active semi-persistent schedule (SPS) configurations and allocated resources for periodic, aperiodic and/or single transmissions, until the second condition is met.

In a further possible implementation form of the third aspect, the plurality of operation profiles comprise at least one operation profile associated with an expected OOC event of the UE.

In a further possible implementation form of the third aspect, according to the operation profile associated with an expected OOC event, the UE is configured to operate in the first mode, until the second condition is met, by using active semi-persistent schedule (SPS) configurations and/or allocated resources for periodic transmissions, by selecting one or more of a plurality of resources assigned by the network entity to be used during the expected OOC event and/or by using a one-shot schedule provided by the network entity.

In a further possible implementation form of the third aspect, the network entity is configured to generate the operation profile associated with an expected OOC event on the basis of information provided by another UE having experienced the expected OOC event.

In a further possible implementation form of the third aspect, the network entity is configured to provide a time threshold, a distance threshold and/or a probability to the UE and the second condition is met if one or more of the following conditions is met: a time elapsed since the start of the OOC event is larger than the time threshold; a distance travelled by the UE since the start of the OOC event is larger than the distance threshold; the UE does not operate in the first mode with the probability provided by the network entity; a load of the resources allocated for the first mode is larger than a predefined threshold.

In a further possible implementation form of the third aspect, the network entity is configured to determine, on the basis of information provided by another UE having experienced the expected OOC event, a size of resource pools to be used by the UE in the first mode and/or second mode.

In a further possible implementation form of the third aspect, the network entity is configured to map the resource pools to be used by the UE in the first mode and/or second mode to moving zones, such as a moving group of vehicles. In an implementation form, moving zones can be further configured, e.g., by a timer or START/STOP times.

In a further possible implementation form of the third aspect, the network entity is configured to allocate downlink resources to be used by the UE in the first mode and/or the second mode.

According to a fourth aspect, the disclosure relates to a method for operating a network entity, in particular a base station, for managing communication resources in a cellular communication network, wherein the network entity is configured to communicate with a UE, wherein the UE can be operated in a first mode and in a second mode, wherein the first mode is a scheduled resource allocation mode and the second mode is an autonomous resource selection mode or an idle mode, wherein the method comprises the step of providing the UE information about when to switch to the second mode, in particular based on one or more of the following conditions: a time elapsed since the start of an OOC event is larger than a time threshold; a distance traveled by the UE since the start of an OOC event is larger than a distance threshold; the UE does not operate in the first mode with a probability defined by the network entity; and/or a load of the resources allocated for the first mode is larger than a predefined threshold.

According to a fifth aspect, the disclosure relates to a computer program comprising program code for performing the method of the second or fourth aspect when executed on a computer.

The invention can be implemented in hardware and/or software.

BRIEF DESCRIPTION OF THE DRAWINGS

Further embodiments of the disclosure will be described with respect to the following figures, wherein:

FIG. 12 shows a schematic diagram of a SPS (semi-persistent schedule) configuration by a network entity;

Figure 1:
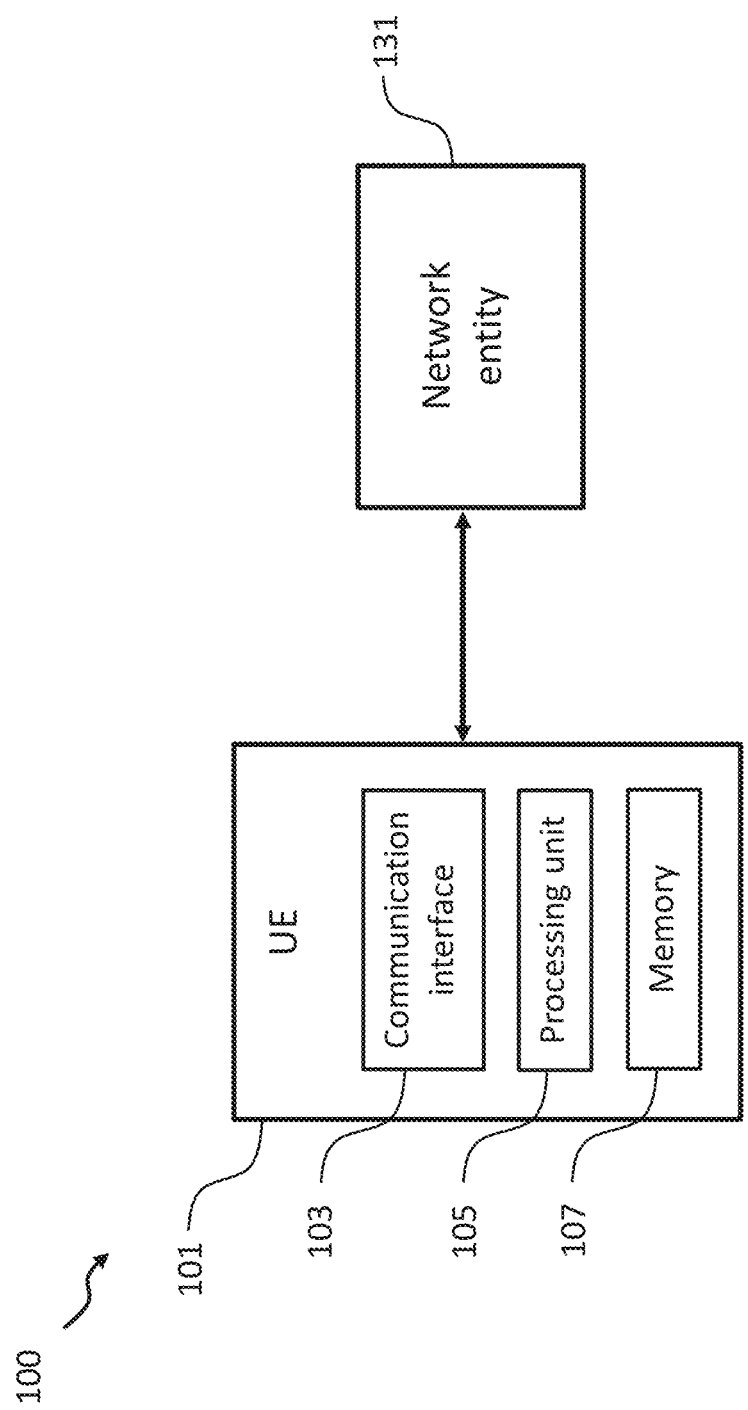
FIG. 1 shows a schematic diagram illustrating a user equipment (UE) in communication with a network entity.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It will be appreciated that other aspects may be utilized and structural or logical changes may be made without departing from the scope of the present disclosure. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims, embodiments with different functional blocks or processing units are described, which are connected with each other and/or which exchange signals. It will be appreciated that the present disclosure covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

As will be described in more detail in the following, embodiments of the disclosure relate to a D2D or V2V communication network comprising at least a user entity (also referred to as a UE hereafter) and a network entity (also referred to as a base station hereafter), which allow for a significant increase in reliability and efficiency of radio resource utilization.

D2D (device-to-device) or V2V (vehicle-to-vehicle) communication can take place when user equipments (UEs), in particular vehicular user equipments, are both in coverage and out of coverage (OOC) of the cellular network. V2V communication can consist of two different types of data traffic: first, periodic messages, e.g., cooperative awareness messages (CAMs), carrying information such as vehicle position and velocity; second, aperiodic messages, transmitted upon a triggering unexpected event, e.g., decentralized environmental notification messages (DENMs) for safety warning purposes.

A centralized network infrastructure entity, such as a base station, can manage radio resource allocation for in-coverage and OOC V2V communications. Modes of operation and resource pools for in-coverage and OOC communications are configured by the network infrastructure entity. The configuration information is periodically broadcast to users via system information messages, e.g., System Information Block 21 (SIB 21).

To determine if a user is out of coverage, a network entity (hereafter also referred to as a base station) can measure received powers of the users fading in/out over time around a certain location at a certain frequency; collect Radio Resource Control (RRC) signaling (e.g., connection or state changes) or measurement reports of users over time at a certain location; or use a map information, e.g., installed by the network operator. The network infrastructure elements, e.g., base stations (BSs), performing the above functions can store information centrally or in a cooperating manner.

When the users are in coverage, resources can be allocated via a scheduled mode of operation (hereafter referred as "Mode 3" as in the 3GPP standard), wherein the users can request transmission resources from the network entity, e.g., the base station. The base station then schedules resources for V2V data and control information transmission. V2V resources are bounded by the resource pools (configured by the network) as follows: normal transmission pools for in-coverage; pre-configured transmission pools for out-of-coverage; exceptional transmission pools for handover; or reception pools covering all above.

The schedule in coverage can be a dynamic or semi-persistent schedule (SPS). The semi-persistent schedule (SPS) is preferred for periodic V2V traffic, e.g., transmission of CAMs. SPS is configured, and activated/deactivated by the network entity. The users report their V2V traffic pattern information (message size, periodicity, priority, etc.) to the network entity, in order to assist this configuration. Activating multiple SPS configurations for single user is possible. When the users are in coverage, the network entity can collect location information and channel busy ratio (CBR) measurement reports from the users to make better resource allocations. Both in coverage and out of coverage of the cellular network, users can adapt their transmissions (e.g., modulation and coding scheme) based on CBR measurements.

FIG. 1 shows a schematic diagram illustrating a communication network 100 comprising a user equipment (UE) 101 according to an embodiment and a network entity 131 according to an embodiment. The UE 101 is configured to communicate with one or more nearby UEs (not shown in FIG. 1) via a sidelink (i.e. D2D or V2V) communication channel and communicate with the network entity 131 via an uplink/downlink communication channel.

In the embodiment shown in FIG. 1, the UE 101 could be implemented in the form of a user equipment such as a mobile phone or a vehicle or a communication module of a vehicle. However, it will be appreciated that embodiments of the disclosure apply to user equipments other than mobile phones or vehicles as well. In an exemplary embodiment, the network entity 131 can be for instance a base station and is configured to manage communication resources in the cellular communication network 100.

As illustrated in FIG. 1, the UE 101 comprises a communication interface 103 configured to perform communication with one or more nearby UEs (not shown in FIG. 1) using one or more of a plurality of resources allocated by the network entity 131 in the cellular communication network 100. Furthermore, the UE 101 comprises a processing unit 105 configured to operate the UE 101 in a first mode and in a second mode, wherein the first mode is a scheduled resource allocation mode and the second mode is an autonomous resource selection mode or an idle mode, as already mentioned above. By way of example, the scheduled resource allocation mode can be a 3GPP LTE-A mode 3 and the autonomous resource selection mode can be a 3GPP LTE-A mode 4.

As will be described in more detail in the context of FIG. 2, the processing unit 105 is configured to switch from the first mode to the second mode, if a first condition relating to an out of coverage (OOC) event or status of the UE 101 is met and a second condition related to a further parameter is met.

In an embodiment, the second condition is met if one or more of the following conditions is met: a time elapsed since the start of the OOC event is larger than a time threshold; a distance travelled since the start of the OOC event is larger than a distance threshold; the UE 101 does not operate in the first mode with a probability, wherein the UE 101 stays in the first mode randomly with that probability; and/or a load of the resources allocated for the first mode is larger than a predefined threshold. The network entity 131 of the cellular communication network can be configured to provide the time threshold, the distance threshold and/or the probability to the UE 101.

In an embodiment, the network entity 131 is configured to generate a plurality of operation profiles associated with an expected OOC event on the basis of information provided by another UE having experienced the expected OOC event. Moreover, the network entity 131 is configured to provide the plurality of operation profiles to the UE 101. The UE can comprise a memory 107 (as shown in FIG. 1) configured to store the plurality of operation profiles, wherein the plurality of operation profiles can comprise at least one operation profile (a kind of default operation profile), wherein the processing unit can be configured to, until the second condition is met, operate the UE in the first mode according to the at least one default operation profile. An operation profile can define communication resources and/or a communication behaviour to be used by the UE 101.

In an embodiment, the network entity 131 is configured to determine a size of resource pools to be used by the UE 101 in the first mode and/or second mode, on the basis of information provided by another UE having experienced the expected OOC event. Furthermore, the network entity 131 can map the resource pools to be used by the UE 101 in the first mode and/or second mode to moving zones such as a moving group of vehicles, wherein zones can be further configured, e.g., by a timer or START/STOP times. The network entity 131 can also allocate downlink resources to be used by the UE 101 in the first mode and/or second mode.

If an unexpected OOC event occurs, the processing unit 105 can operate the UE 101 in the first mode according to another default operation profile in response to the unexpected OOC event. Furthermore, the processing unit 105 of the UE 101 can be configured to operate the UE 101 in the first mode by using active semi-persistent schedule (SPS) configurations and allocated resources for periodic, aperiodic and/or single transmissions, until the second condition is met.

If an expected OOC event occurs, on the other hand, the processing unit 105 of the UE 202 can be configured to operate the UE 101 in the first mode according to the operation profile associated with the expected OOC event, in response to the expected OOC event. Furthermore, the processing unit 105 can operate the UE 101 in the first mode by using active semi-persistent schedule (SPS) configurations and allocated resources for periodic transmissions, by selecting one or more of a plurality of resources assigned by the network entity 131 to be used during the expected OOC event and/or by using a one-shot schedule provided by the network entity 131. The one-shot schedule is a single, complete resource assignment to the UE 101 and can comprise, for instance, different time and frequency slots to be exclusively used starting from the time the OOC condition is met until the time the OOC condition is over.

According to a further embodiment, in case the second mode is an autonomous resource selection mode, the processing unit 105 of the UE 101 is further configured to operate the first mode in parallel with the second mode, in response to an OOC event until a second condition is met, in particular by using the first mode for periodic transmissions and the second mode for aperiodic transmissions.

According to a further embodiment, in case the second mode is an autonomous resource selection mode, the communication interface 103 of the UE 101 is configured to sense a load of the resources for the second mode and the processing unit 105 of the UE 101 is configured to replace a transmission on resources allocated for the first mode with a high priority transmission of the second mode, in particular in case the load of the resources for the second mode is larger than a load threshold for the second mode.

In response to an OOC event, the communication interface can also sense a load of the resources, in particular a CBR value, allocated for the first mode and the second condition is met if the sensed load is larger than a load threshold for the first mode.

Thus, in an embodiment, the communication interface 103 of the UE 101 is configured to sense a load of the resources, in particular a CBR value, allocated for the first mode and the processing unit 105 of the UE 101 is configured to record information about times and/or locations, at which the sensed load is larger than a load threshold, and/or context information of the UE 101, e.g. motion state, road conditions, and to provide the information to the network entity 131.

According to a further embodiment, the communication interface 103 of the UE 101 is configured to use downlink resources in the second mode, i.e. the autonomous resource selection mode. Furthermore, the communication interface 103 of the UE 101 is configured to transmit information (e.g. a counter) about the number of next transmissions of the same type, e.g., MAC PDUs of same size, belonging to the same sidelink communication process, in particular to reserve the same selected resources for that number of times on the communication interface 103 to other UEs.

In case the second mode is an autonomous resource selection mode, the communication interface 103 of the UE 101 can also transmit information about the number of upcoming transmissions of the communication interface 103 to other UEs, in case the number of transmissions is smaller than a threshold value (provided, for instance, by the network entity 131) and to transmit a random number for the number of transmissions, in case the number of transmissions is larger than the threshold value.

Figure 2:
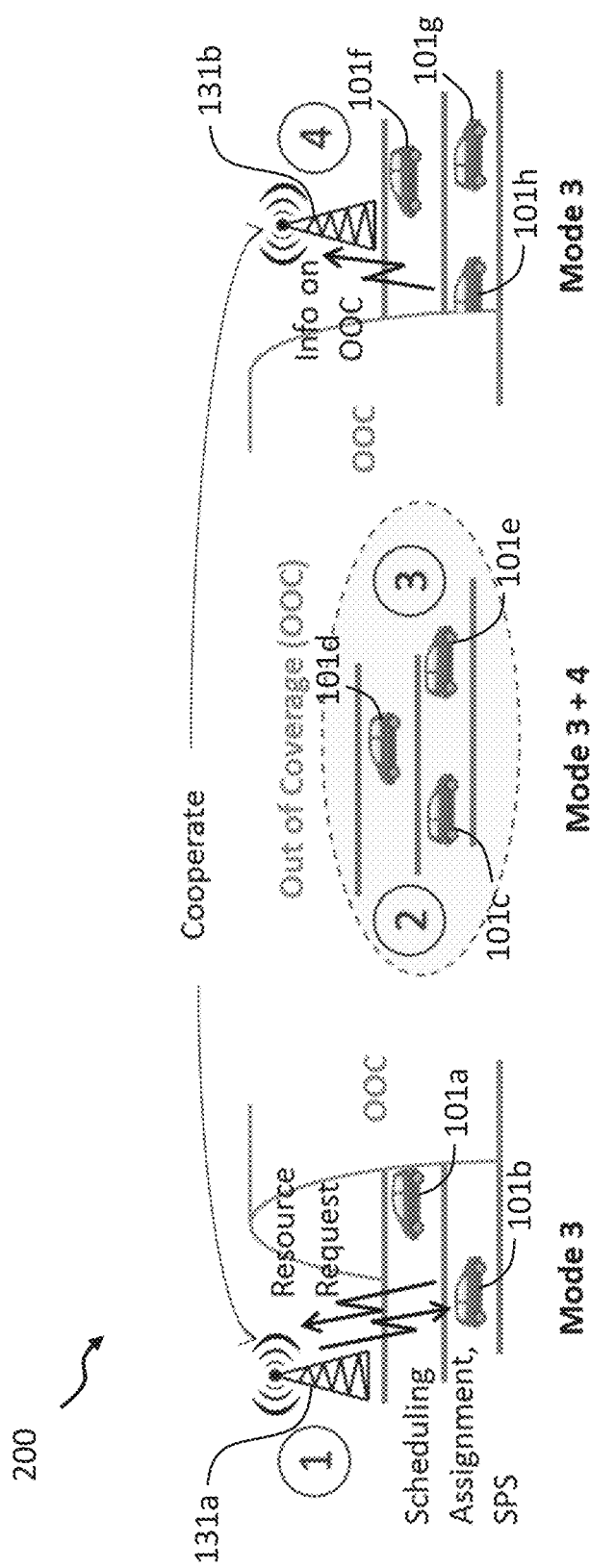
FIG. 2 shows a schematic diagram of a communication network comprising a plurality of network entities and a plurality of UEs.

As discussed above, the embodiments of the present disclosure can exploit in-coverage radio resource management control for out-of-coverage (OOC) events, which is shown in FIG. 2. It is to be appreciated that the out-of-coverage (OOC) events refer to the situations in which the user equipments (UEs) 101 are out of coverage of the network entity, i.e. base station 103. FIG. 2 show a schematic diagram of the communication network 100 comprising a plurality of network entities 131*a-b* according to an embodiment and a plurality of UEs 101*a-h* according to an embodiment, wherein an OOC event occurs as the UEs 101*a-h* enter a tunnel, which is limited by the network infrastructure (base stations) at the two ends of the tunnel. The base stations 131*a-b* can cooperate to control the radio resources for V2V communications for the OOC event. According to an embodiment radio resource can be managed in response to the OOC event on the basis of one or more of the following steps.

In step 1, the UEs 101*a-h* can keep their allocated or "pre-scheduled" resources in coverage especially for periodic or semi-persistent transmissions for OOC events, hence extending resource allocations in the first mode, i.e. Mode 3, to the OOC situations. This solution is also referred to as "Extended Mode 3" hereafter.

In step 2, embodiments of the disclosure allow coexistence of the Extended Mode 3 and the Mode 4 operation (i.e. the second mode or UE autonomous resource selection) as well as interaction between the Extended Mode 3 and the Mode 4 operation in OOC situations.

In step 3, embodiments of the disclosure can improve the Mode 4 resource allocation and selection procedures for OOC events. In step 4, the UEs 101*a-h* can also provide information about the OOC situations to the network infrastructure entities 131*a-b*, i.e. the base stations, when they are back in coverage of the cellular network 100.

According to the current standard, the UEs 101 generally switch completely to the autonomous resource selection (i.e. mode 4) if they are out of coverage of the base station. On the other hand, according to an embodiment, the mode 3 can be extended into the area out of coverage in certain OOC scenarios in order to achieve higher reliability and resource usage efficiency. The OOC events comprise the following two types: a Type I OOC event, being unexpected or unknown by the network entity 131; or a Type II OOC event, being expected or known by the network entity, i.e. base station 131.

Figure 3:
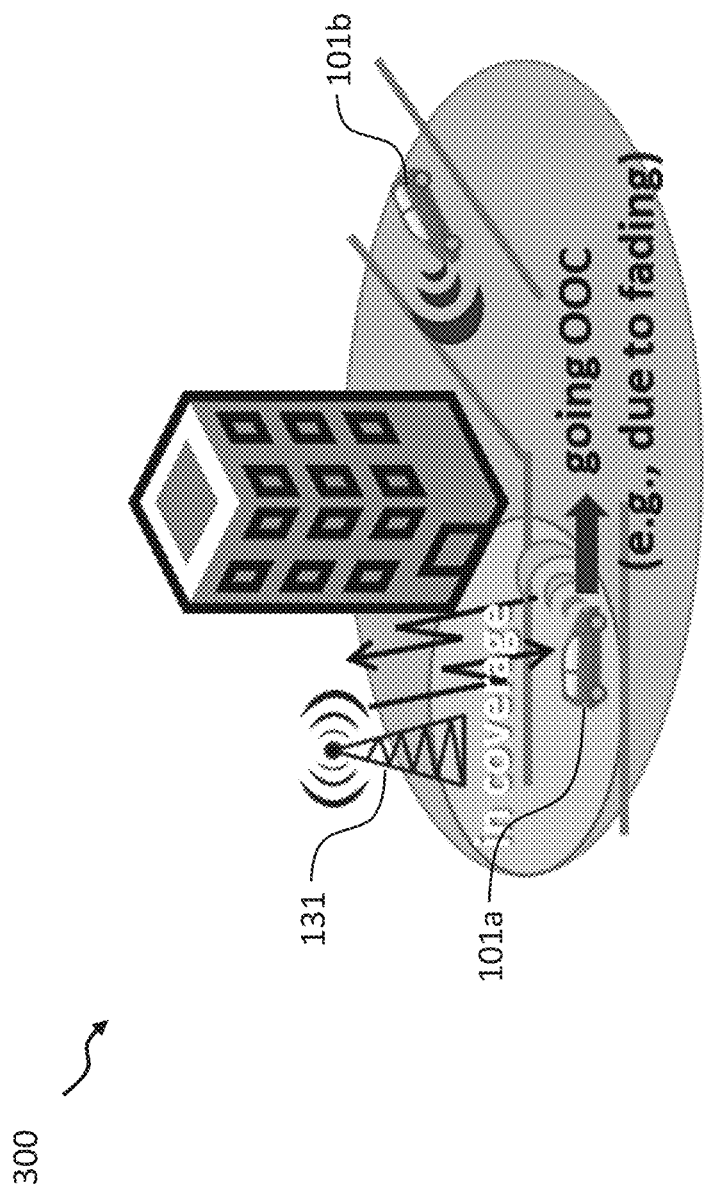
FIG. 3 shows a schematic diagram of a communication network comprising a network entity and a plurality of UEs.

FIG. 3 shows a schematic diagram of the communication network 100 comprising the network entity 131 according to an embodiment and a plurality of UEs 101*a-b* according to an embodiment, wherein the Type I OOC event may occur, e.g., because of extreme fading conditions for the UE 101*a*, as the UE 101*a* enters an area in which the communication with the base station 131 is hindered by a building or other obstacles.

Figure 4:
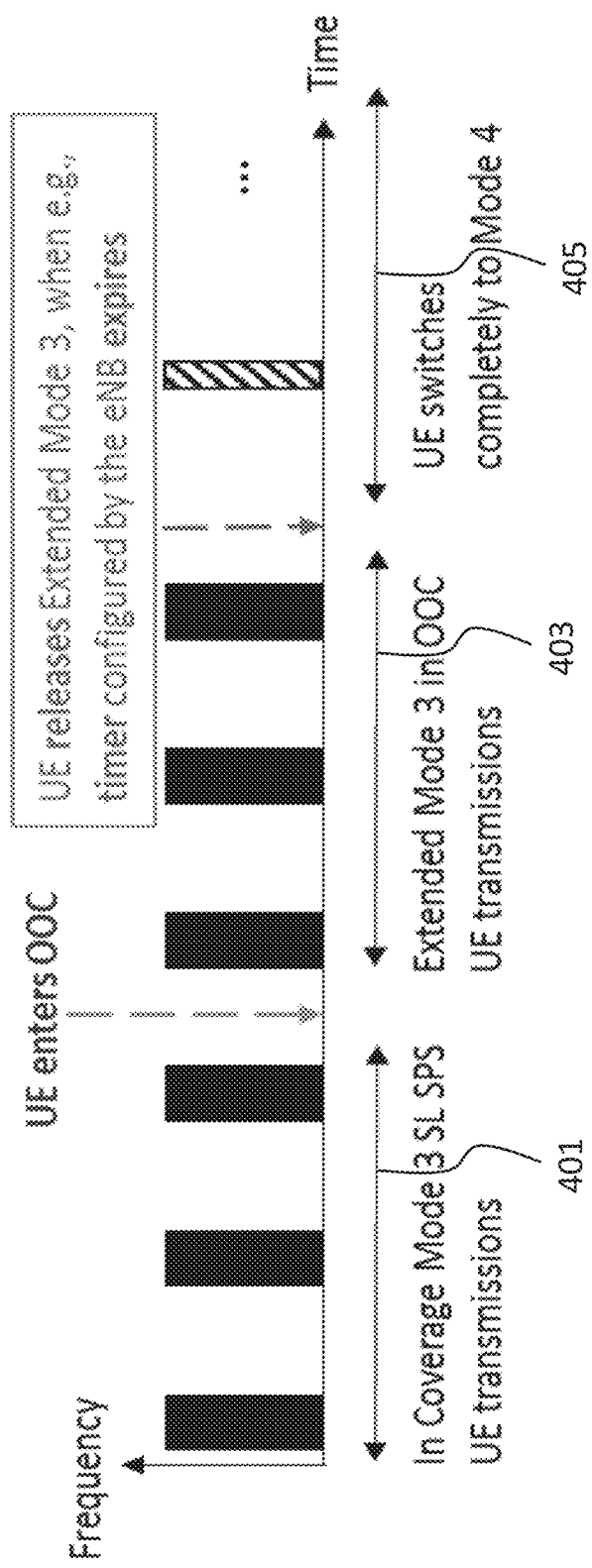
FIG. 4 shows a schematic diagram of exemplary resource utilization for a UE in extended mode 3.

In such case, as shown in FIG. 4, the UEs 101 can operate in Extended Mode 3 and keep using their latest scheduled resources or SPS configurations/resources for periodic transmissions, according to a default operation profile configured by the network entity 131 (stage 403). The default operation profile of UEs 101 in case of an unexpected OOC event, can be broadcast to all UEs 101 by the base station(s) 131 via SIB21 message. The default user operation profile indicates the users to keep their latest allocated resources according to a threshold, e.g., a timer, a probability, or a distance from the network coverage boundary, after they enter the OOC area. After the threshold is exceeded, the user releases the Extended Mode 3 resources, namely completely switches to Mode 4, while the user is still out of coverage (stage 405).

Figure 5:
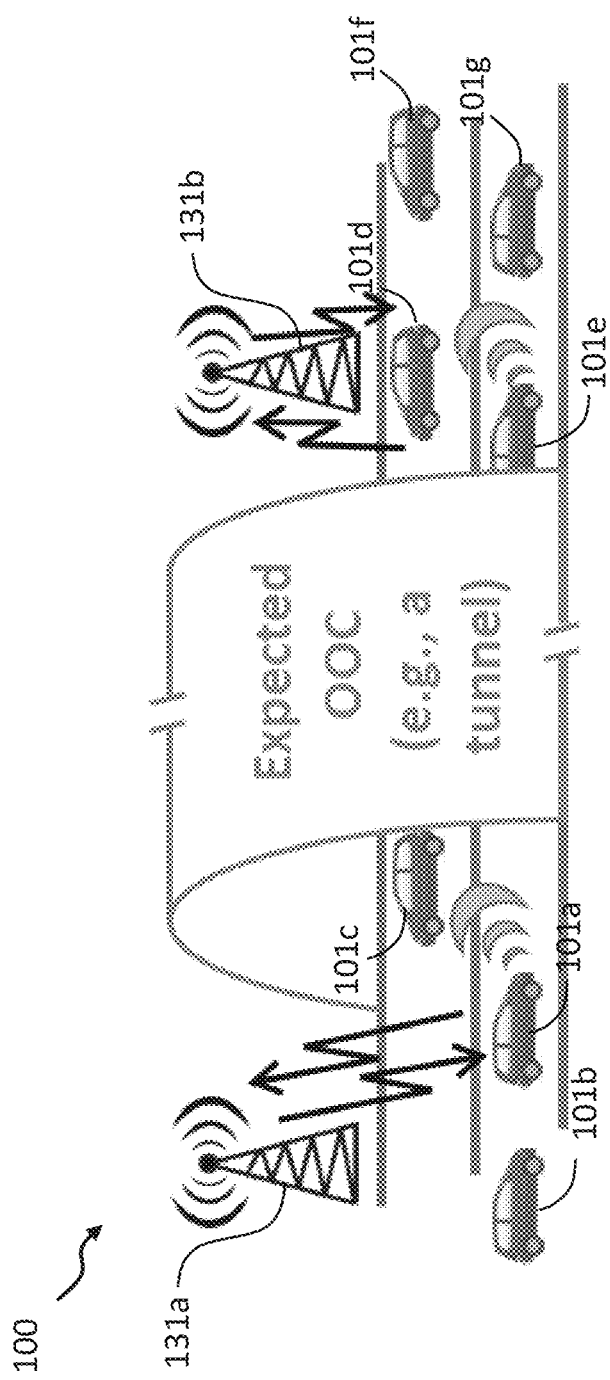
FIG. 5 shows a schematic diagram of a communication network comprising a plurality of network entities and a plurality of UEs.

FIG. 5 show a schematic diagram of the communication network 100 comprising a plurality of network entities 131*a-b* according to an embodiment and a plurality of UEs 101*a-g* according to an embodiment, wherein a type II OOC event occurs, which is known and expected by the network entities 131*a-b* (i.e. base stations), e.g., as a road tunnel bounded by the network coverage at two ends.

In such a case, the base stations 131*a-b* can allocate or "pre-schedule" the OOC resources specific to request of each UE 101*a-g* and/or provide additional configuration/information for the OOC event when allocating the resources. When the UEs 101*a-g* enter the out of coverage area, the UEs 101*a-g* can use this resource allocation and behave according to the specific configuration.

The resource allocation can be in form of providing a semi-persistent-schedule (SPS) or a one-shot schedule for the entire OOC area. Multiple resources can be provided to the UEs 101, among which the UEs 101 can select one resource autonomously for the OOC event, based on, e.g., sensing results. The specific configuration can be providing the schedule (SPS or one-shot) with a threshold, e.g., a timer and/or a probability, for each user to keep using the allocated resources when they enter the out of coverage area.

After the threshold is exceeded, the UEs 101 can release the Extended Mode 3 resources, namely completely switch to Mode 4, while they are still out of coverage of the base stations 131. The specific OOC configuration can be sent to the UEs 101 by RRC signaling, e.g., SPS activation or DCI 5A messages. With a known/expected OOC event, the network entity 131 will have a chance to make predictions in order to make better radio resource management for V2V communication under an OOC event.

Figure 6:
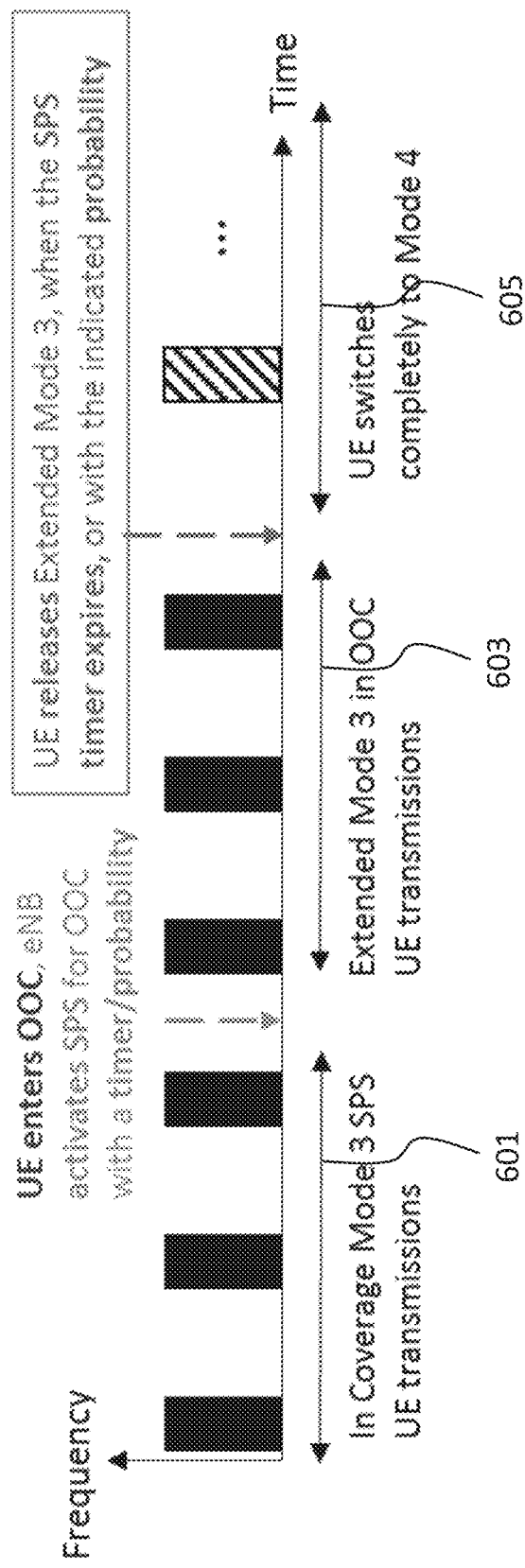
FIG. 6 shows a schematic diagram of exemplary resource utilization for providing a semi-persistent-schedule.
Figure 7:
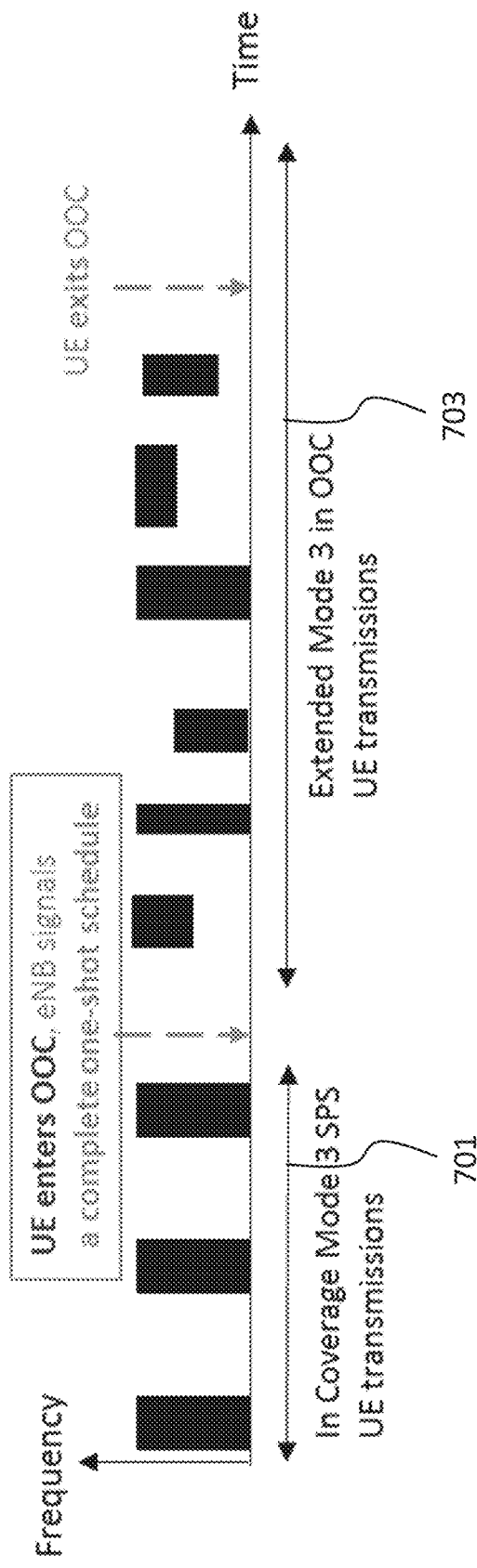
FIG. 7 shows a schematic diagram of exemplary resource utilization for providing a one-shot schedule.

Exemplary resource utilization for providing a semi-persistent-schedule (SPS) and a one-shot schedule by the UE 101 according to an embodiment are illustrated in FIGS. 6 and 7 respectively.

As shown in FIG. 6, the network entity or base station 131 can activate a semi-persistent-schedule (SPS) in response to an OOC event with a timer or probability and the UE 101 can use the specific SPS and operate in extended mode 3 according to an operation profile configured by the base station 131 upon entry into an OOC area expected by the base station 131 (stage 603). Afterwards, the UE 101 can release resources from extended mode 3 when the SPS timer expires or with the indicated probability and switch to mode 4 completely (stage 605).

Similar to FIG. 6, FIG. 7 shows resource utilization and allocation for providing a one-shot schedule to the UE 101 according to an embodiment, wherein the base station 131, implemented, for instance, as an eNB, can signal a complete one-shot schedule as soon as the UE 101 enters an out of coverage area and the UE 101 can use a one-shot schedule throughout an OOC area expected by the network entity 131 (stage 703).

In response to an OOC event, the UEs 101 can make autonomous resource selection (Mode 4) for aperiodic transmissions (e.g., decentralized environmental notification messages or DENMs). This mode can be operated in parallel or/and through interaction with the Extended Mode 3 for an OOC event, as will be further described in more detail further below.

According to an embodiment, the UEs 101 make sensing on the allocated resources in Extended Mode 3 when they are out of coverage, and the UEs 101 may release Extended Mode 3 resources based on the sensing result, e.g., release if the sensed receive power is above a threshold. The threshold to release Extended Mode 3, e.g., a CBR value, can be further configured by the network entity 131 and signaled to the UEs 101 before they enter the area out of coverage.

The UEs 101 may release Extended Mode 3 and switch to Mode 4 while they are still out of coverage, which can occur even before the timer or the distance indicated by the base station 131, if the sensing threshold is exceeded, e.g., due to large number of collisions.

Figure 8:
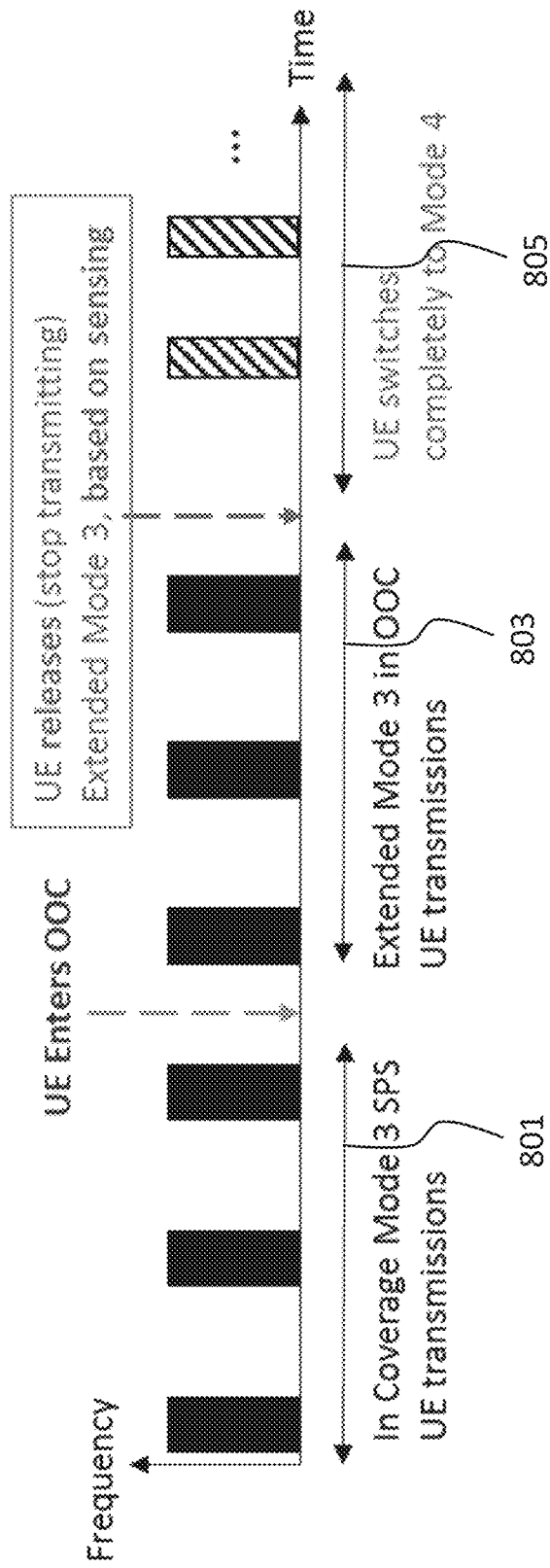
FIG. 8 shows resource allocation and utilization based on a sensing result by a UE.

FIG. 8 shows resource allocation and utilization based on a sensing result by the UE 101 according to an embodiment, wherein the UE 101 can operate in Extended Mode 3 and keep using its latest scheduled resources (stage 803) and later the UE 101 can release resources, i.e. stop transmitting, in Extended Mode 3 based on a sensing result and switch to mode 4 completely (stage 805).

Figure 9:
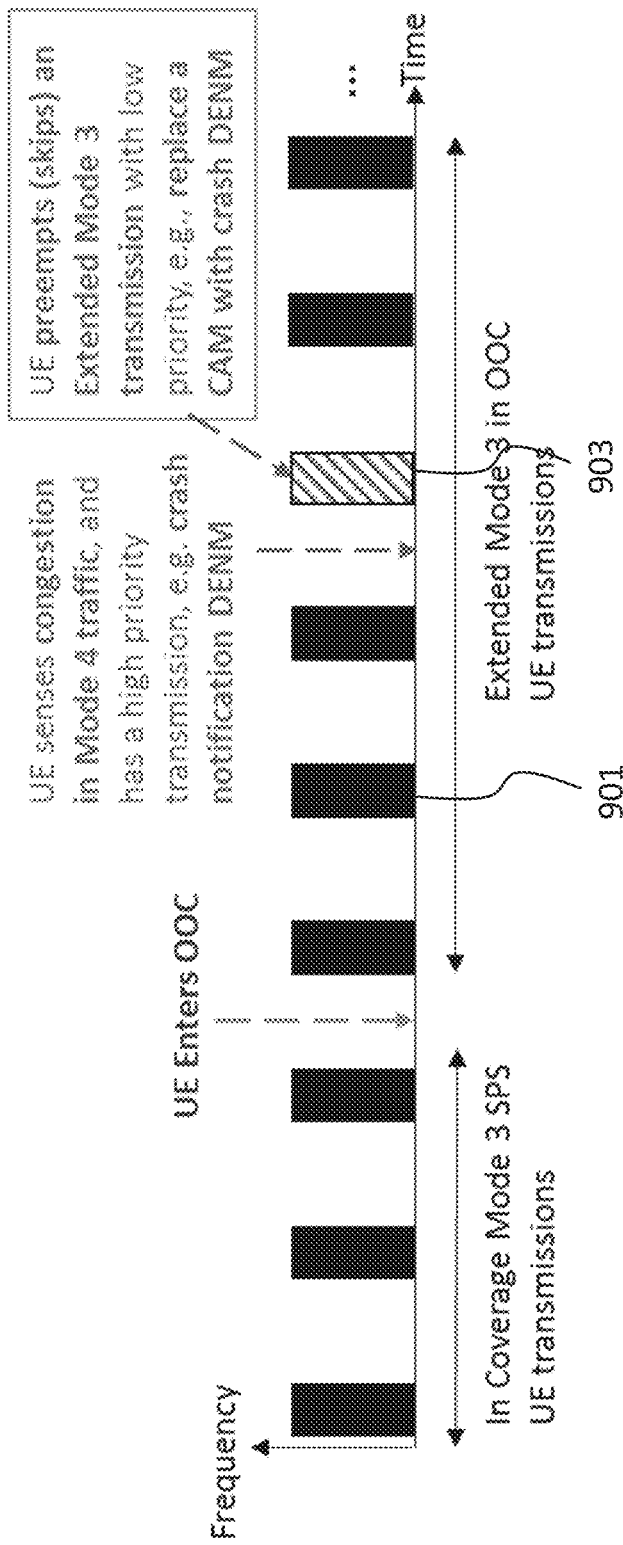
FIG. 9 shows a schematic diagram of pre-empting extended mode 3 transmissions by a UE.

In case of congestion in aperiodic traffic, which is operated by Mode 4, the UE 101 can preempt, i.e., skip, the pre-scheduled Extended Mode 3 transmissions with lower priority (e.g., cooperative awareness messages, CAMs) to transmit high priority messages (e.g., crash notification). The SPSs allowed to be preempted for certain priorities can be further configured by the network entity 131 i.e. the base station and signaled to the UE 101 before the UE 101 enters the OOC area. FIG. 9 shows a schematic diagram of preempting Extended Mode 3 transmissions by the UE 101 according to an embodiment for high priority aperiodic messages, wherein the UE 101 first operates in extended mode 3 (stage 901), then senses congestion in mode 4 traffic and has a high-priority transmission such as crash notification DENM. The UE 101 can thus preempt or skip an Extended Mode 3 transmission with a low priority (stage 903), for instance, the UE 101 can replace a cooperative awareness message (CAM) by a decentralized environmental notification messages (DENMs) providing information about a car crash.

In an embodiment, the network entity 131 can better allocate the resources for an OOC event (both in Extended Mode 3 and Mode 4) via the following advantageous embodiments.

In a first embodiment, the network entity 131 can improve the configuration of OOC resource pools in case of a Type II OOC event, i.e. an expected/known OOC event, by determining the size of Mode 4 OOC resource pools based on the information about the OOC event provided by the UEs 101. Instead of geographical zones, moving zones can be mapped to the OOC resources. Each zone can be allocated to a group, i.e., a cluster of road or data traffic users. Moving zones can be configured by a timer to be used by the UEs 101 to keep using the corresponding resources for an OOC event. This is also useful when the UEs 101 cannot determine their location (e.g., inside a tunnel) to find the geographical zone according to the current standard.

In a further embodiment, the network entity 131 can include downlink (DL) spectrum into the resource pool for V2V communication under an OOC event, while resources for V2V communications are allocated from the uplink spectrum according to the conventional standard.

In case of a Type II OOC event (i.e. an expected/known OOC event), the network entity 131 according to an embodiment may allocate resource pools for the OOC usage, also from the downlink (DL) spectrum. The OOC pools are configured to be used after a time or distance away from the in-coverage—OOC boundary so as to not interfere with in-coverage DL traffic. The pools belonging to the DL spectrum could be further configured by the network entity 131 and signaled to the UEs 101 before they enter an OOC area. Included DL frequency bands for V2X operation can be provided as "inter-band carrier aggregation".

Additionally, the autonomous resource selection procedure in Mode 4 under an OOC event can also be improved by the UE 101 according to a further embodiment. In the current standard, the UEs 101 keep (reserve) each resource they selected based on sensing for a random number of transmission times, and announce this value (the resource reselection counter) to the other UEs via Sidelink Control Information (SCI). In turn, other UEs exclude that resource when making sensing for that number of times. Therefore, if the UE 101 transmits less than the announced number, the reserved resources will not be used at all.

Instead, the UE 101 according to an embodiment in OOC Mode 4 can reserve and announce their "actual" number of transmissions in Sidelink Control Information (SCI) instead of a random value. Announcing the actual number can especially increase the resource efficiency for one-shot or small number of transmissions, so as not to reserve or occupy the resources more than the required number of times. The actual number of transmissions could be announced, if the number is below a threshold value determined by the network entity 131. For numbers above that threshold, the UEs 101 may again choose a random number.

Furthermore, the UE 101 can provide information about an OOC event to the network entity 131 according to an embodiment: in case of a Type I OOC event (unknown), any information about the OOC event provided by the UEs 101 to the network entity 131 can enable the network entity 131 to be aware of the OOC event. In case of a Type II OOC event (known), any information about the OOC event provided by the UEs 101 to the network entity 131 can improve the resource allocation performance by the network entity 131.

In a further embodiment, the UEs 101 can perform additional measurements when they are out of coverage of the cellular network. The network entity, i.e. base station 131 can determine which UE 101 to collect which data and signal this information to the UEs 101 before they enter an out of coverage area. As a minimal set of measurements, the UEs 101 can measure and save when and where the CBR was larger than a threshold value, wherein the threshold value can be provided by the network entity 131.

Moreover, the UEs 101 can additionally collect data, e.g., Probe Vehicle Data (as in intelligent transportation system (ITS)) or data regarding: road traffic such as vehicle position, velocity, density, etc.; communication traffic such as probability of aperiodic services (e.g., emergency brake notification); or environment data such as propagation conditions, the weather in an OOC area, etc.

In a further embodiment, the UEs 101 can report information about OOC events when they are back in coverage: the UEs 101 can report the data they collected regarding the OOC events to the base stations 131 when they are back in coverage, wherein reporting can be performed via extra fields to be added to the CBR report or UE assistance information messages.

In a further embodiment, the network entities 131 can exchange information regarding OOC events: the network infrastructure nodes, such as base stations 131, can cooperate with each other by means of exchanging information regarding the OOC events in order to improve resource allocations for the OOC events. Exchanged information may comprise measurements or data reported by the UEs 101 regarding the OOC events.

Figure 10:
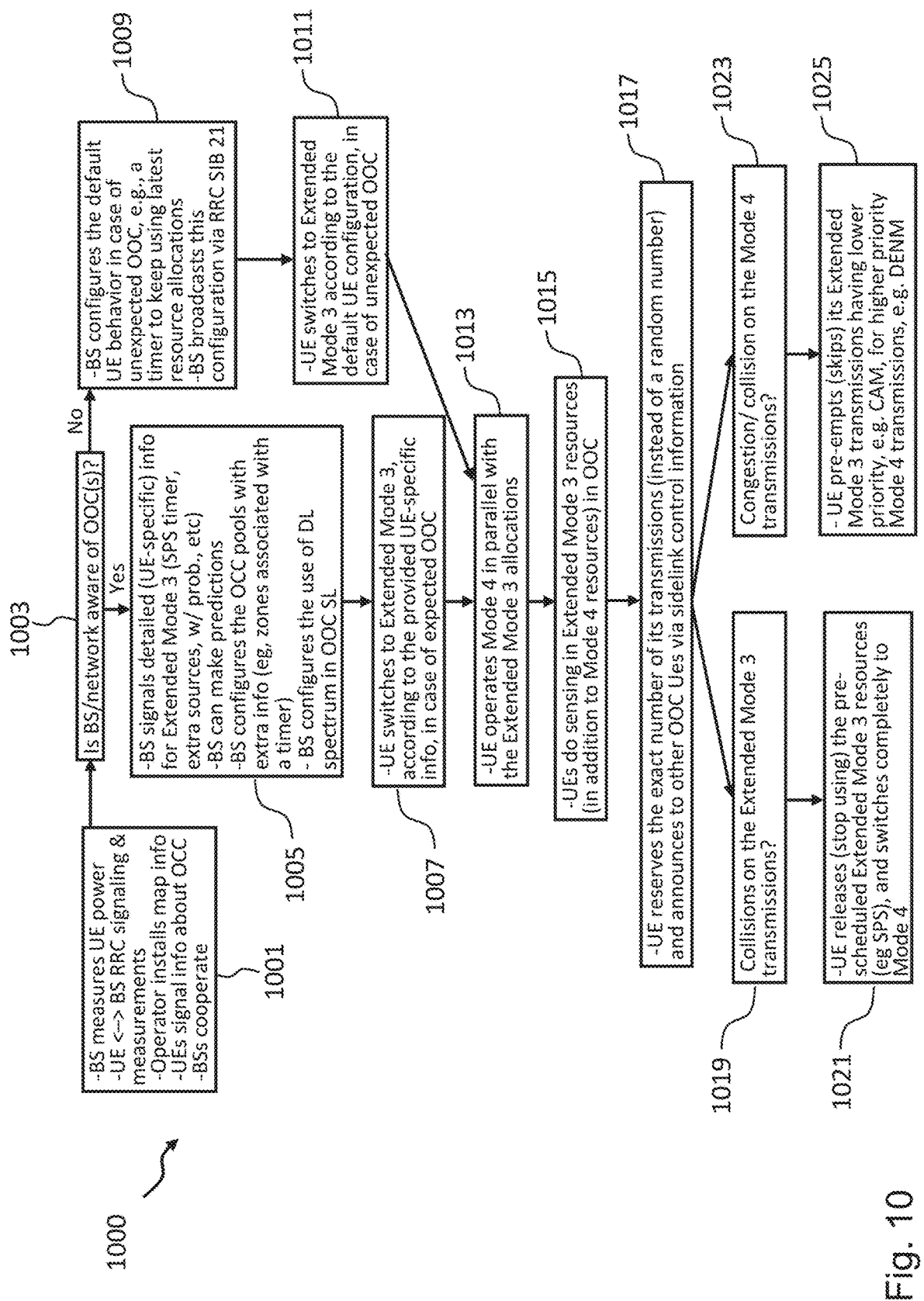
FIG. 10 shows a schematic diagram summarizing a procedure for V2V communication in a communication network.

FIG. 10 shows a schematic diagram summarizing a procedure 1000 for V2V communication in a communication network according to an embodiment when an OOC event occurs. The procedure 1000 shown in FIG. 10 comprises the following steps:

First, the base station 131 measures the UE power or collect RRC (Radio Resource Control) signaling or measurement reports of UEs over time at a certain location; an operator installs map information; the UEs signal information about OOC events to the base station(s) 131; the base stations 131 can cooperate (step 1001).

The base station 131 is checked if it is aware of the OOC event (step 1003).

If yes, the base station 131 can signal detailed information for extended mode 3 and make predictions; the base station 131 can further configure the OOC pools with extra information such as zones associated with a timer and the use of downlink spectrum for an OOC event (step 1005).

The UE 101 can switch to extended mode 3 according to the provided UE-specific information in case of an expected OOC event (step 1007).

If no, the base station 1311 configures a default operation profile for the UE 101 in case of an unexpected OOC event and broadcasts the configuration via RRC SIB21 message (step 1009).

The UE 101 can switch to extended mode 3 according to the default operation profile in case of an unexpected OOC event (step 1011).

The UE 101 can operate mode 4 in parallel with the extended mode 3 (step 1013).

The UE 101 can perform sensing on extended mode 3 resources (in addition to mode 4 resources) for an OOC event (step 1015).

The UE 101 can reserve the exact number of transmissions instead of a random number and announce to other UEs via sidelink control information (step 1017).

The UE 101 checks if there are collisions on the extended mode 3 transmissions (step 1019).

If yes, the UE 101 can release the pre-scheduled extended mode 3 and switch completely to mode 4 (step 1021).

The UE 101 checks if there are collisions or congestions on the mode 4 transmissions (step 1023).

The UE 101 can preempt or skip its extended mode 3 transmission having lower priority e.g. CAM for higher priority mode 4 transmissions, e.g. DENM (step 1025).

Figure 11:
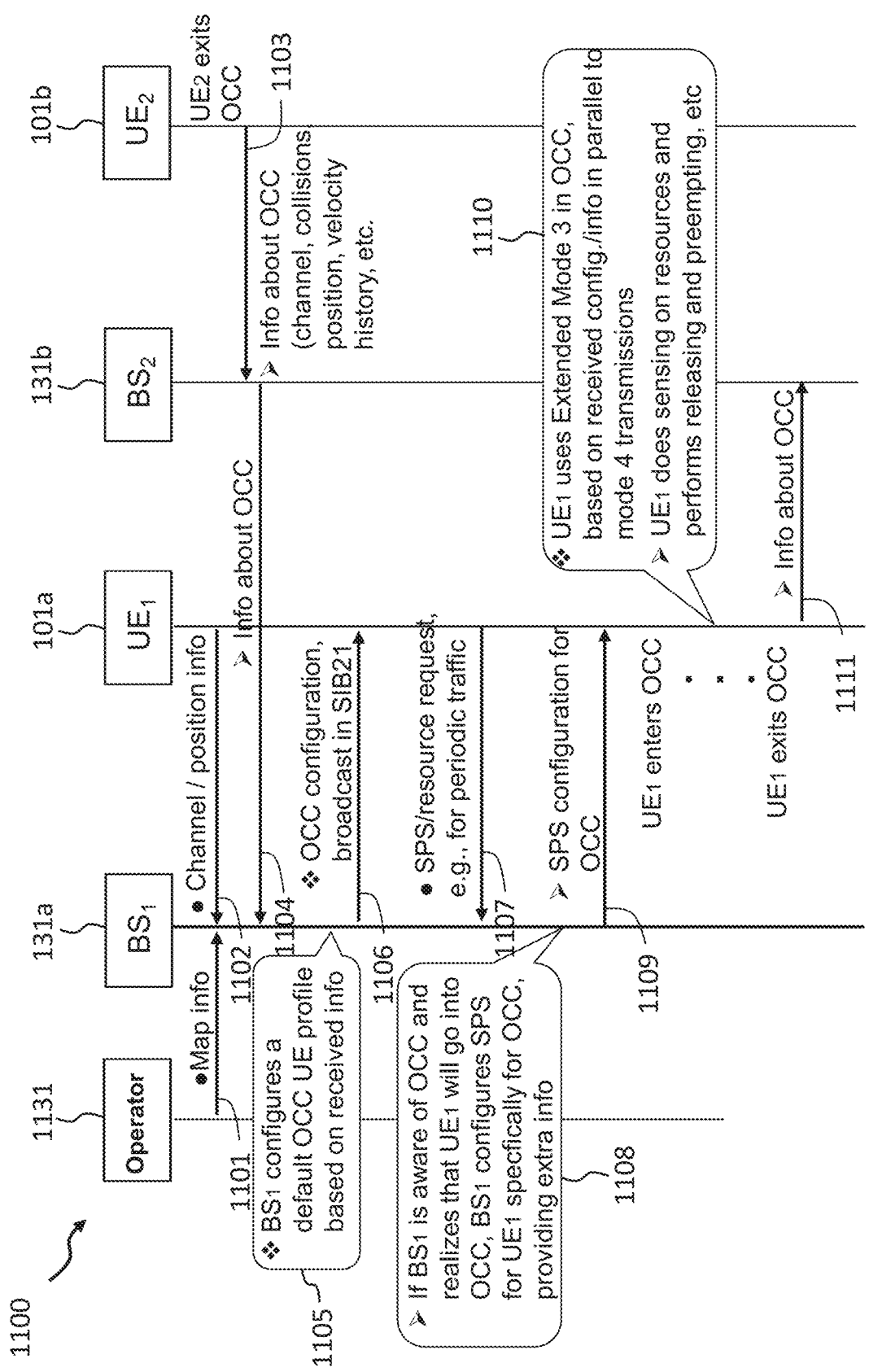
FIG. 11 shows a schematic diagram summarizing a procedure for V2V communication in a communication network.

FIG. 11 shows a schematic diagram summarizing a procedure 1100 for V2V communication in the communication network 100 according to an embodiment, wherein the communication network 100 comprises a first base station 131a, a first UE 101a, a second base station 131b and a second UE 101b and wherein the first UE 101a is entering an out of coverage area of the cellular network defined by a tunnel and the second UE 101b is leaving the tunnel. The procedure 1100 shown in FIG. 11 comprises the following steps:

The network operator can install map information and transmit the map information to the first base station 131a (step 1101).

The first UE 101a transmits the channel and position information to the first base station 131a (step 1102).

The second UE 101b transmits the information about the OOC event, e.g. channel information, collisions, position information and velocity history to the second base station 131b as the second UE 101b is leaving the out of coverage area (step 1103).

The second base station 131b shares the information about the OOC event with the first base station 131a (step 1104).

The first base station 131a configures a UE default operation profile based on the received information from the second base station 131b (step 1105).

The default operation profile can be broadcast to the first UE 101a via SIB21 message (step 1106).

The first UE 101a sends a request of SPS (semi-persistent schedule) or resource, e.g. for periodic traffic to the first base station 131a (step 1107).

If the first base station 131a realizes that the first UE 101a will enter the out of coverage area defined by the tunnel, the first base station 131a can configure SPS (semi-persistent schedule) for the first UE 101a specifically for the OOC event (step 1108).

The first base station 131a transmits the SPS configuration to the first UE 101a for the OOC event (step 1109).

After the first UE 101a enters the out of coverage area, the first UE 101a can use Extended Mode 3 based on the received configuration from the first base station 131a in parallel to mode 4 transmissions, or the first UE 101a can perform sensing on resources and then release or preempt resources (step 1110).

After the first UE 101a leaves the out of coverage area, the first UE 101a can transmit the information about the OOC event to the second base station 101b (step 1111).

According to another embodiment, the communication network supports the 3GPP standard LTE-A Release 14. The base station 131, hence the network infrastructure, is aware of an OOC event (in particular a type II OOC event) and configures an SPS (semi-persistent schedule) associated with a timer, according to which the UE 101 requesting the SPS will keep using the allocated resources also for the OOC event. The configured timer can be signaled by the base station 131 as an extra field in the RRC message "sps-ConfigSL-14" 1200 as shown in FIG. 12, before the UE 101 enters an area out of coverage of the base station. The extra field to be added can be:

sps-TimeKeep-r16 INTEGER (0 . . . 10000), wherein INTEGER (0 . . . 10000) represents 0, 1, . . . 10000 msec.

The UE 101 receiving the above SPS configuration can keep on using the associated resources for the indicated amount of time upon entering an out of coverage area. Upon the expiration of the timer, the UE 101 can switch to Mode 4 operation, i.e., release Extended Mode 3, if the UE 101 is still out of coverage, which is illustrated in FIG. 13.

Figure 13:
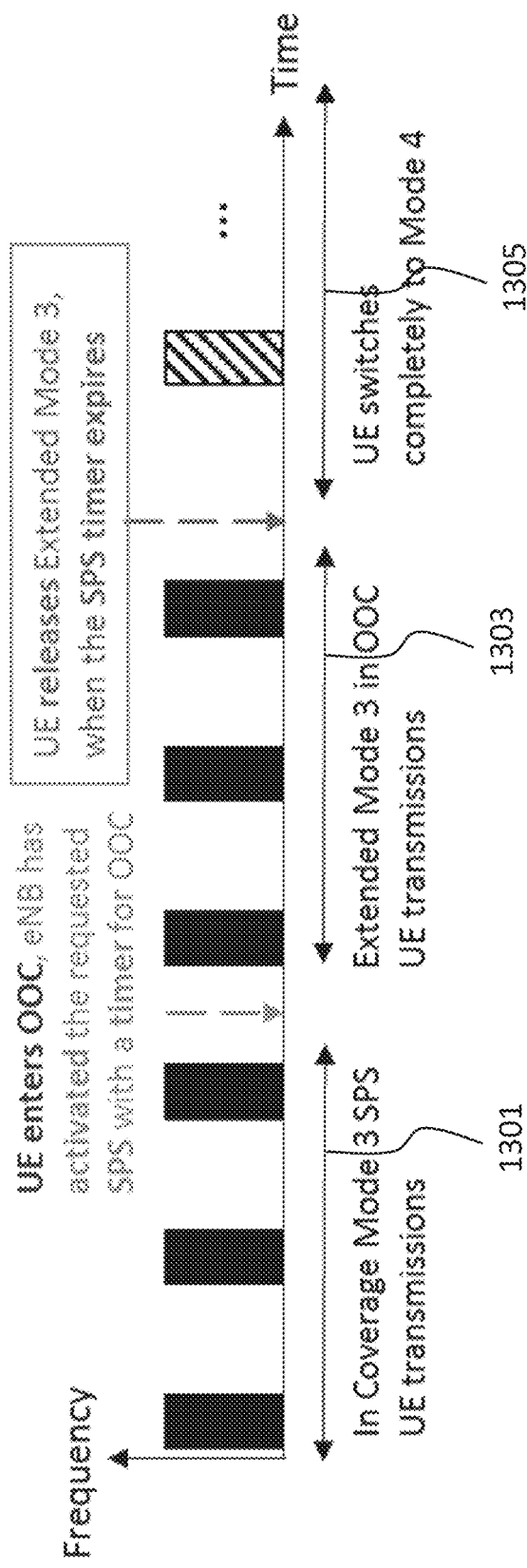
FIG. 13 shows resource allocation and utilization based on a SPS configuration.

FIG. 13 shows resource allocation and utilization based on a SPS configuration according to an embodiment, wherein the base station 131 activates a SPS (semi-persistent schedule) with a timer for an OOC event. When the UE 101 enters an out of coverage area, the UE 101 can operate in extended mode 3 for transmissions (stage 1303). After the SPS timer expires, the UE 101 can release extended mode 3 and switch to mode 4 completely (stage 1305).

Figure 14:
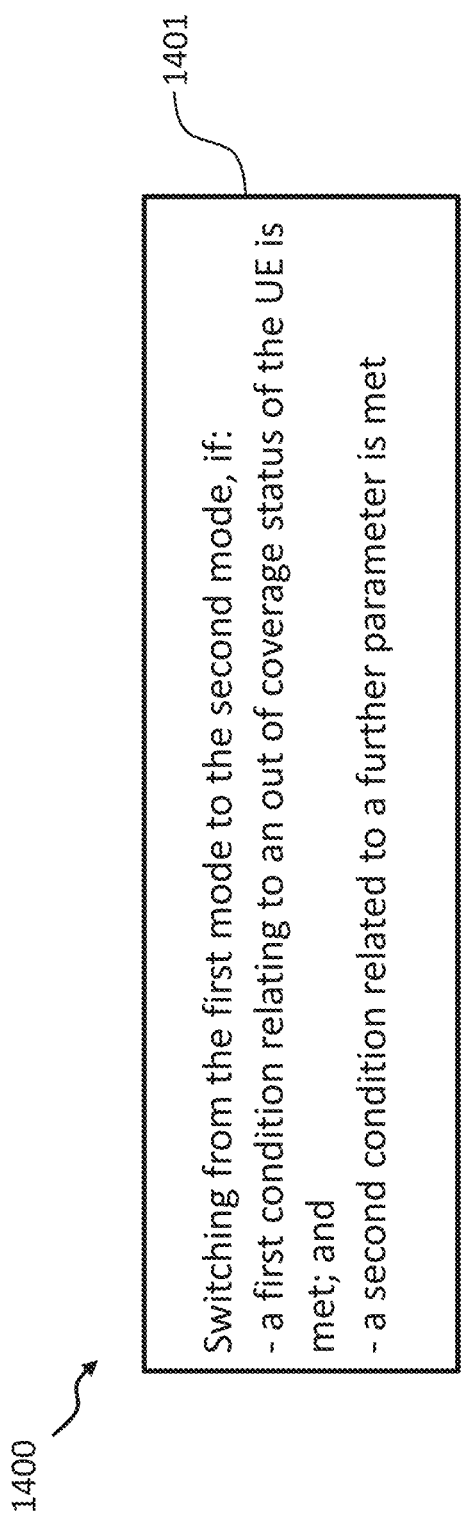
FIG. 14 shows a diagram illustrating a method of operating a user entity.

FIG. 14 shows a diagram illustrating a method 1400 of operating the UE 101. The method 1400 comprises the step 1401 of switching from the first mode to the second mode, if a first condition relating to an out of coverage event/status of the UE 101 is met; and a second condition related to a further parameter is met.

Figure 15:
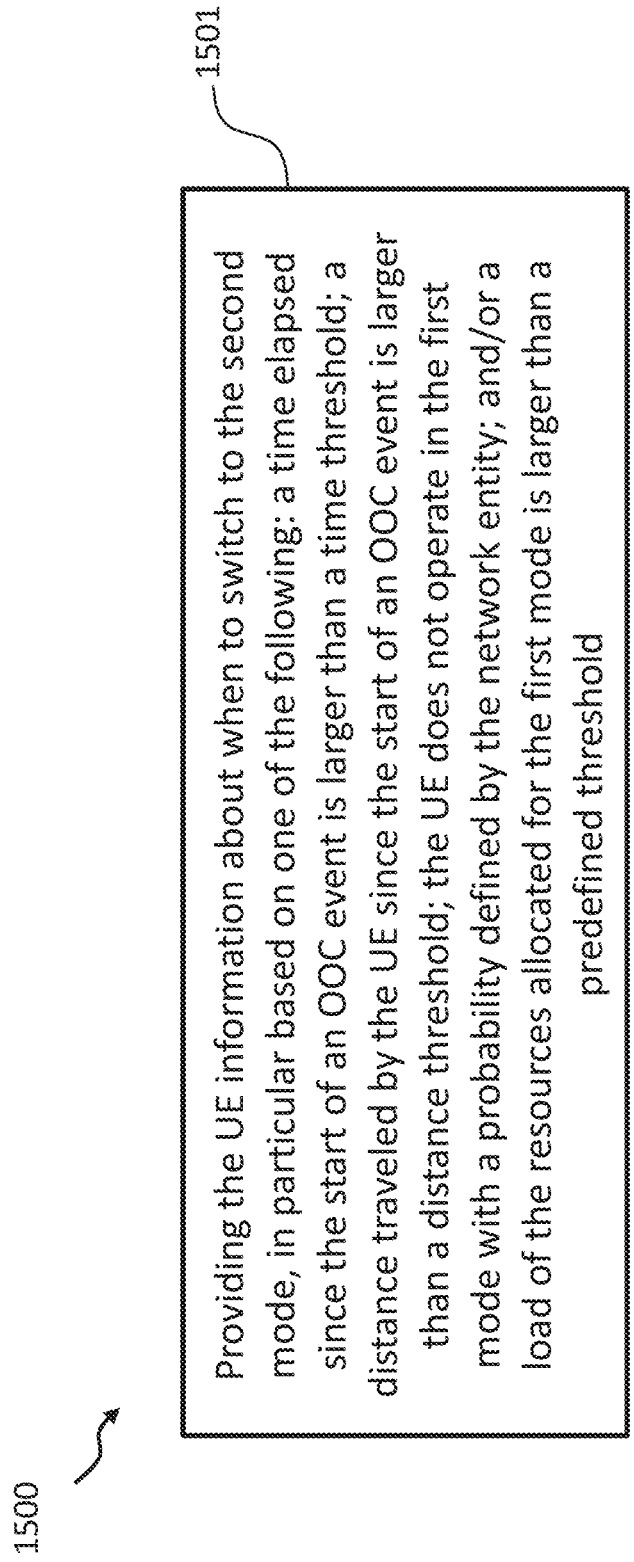
FIG. 15 shows a diagram illustrating a method of allocating resources for D2D communication.

FIG. 15 shows a diagram illustrating a method 1500 for operating the network entity 131. The method 1500 comprises the step 1501 of providing the UE 101 with information about when to switch to the second mode, in particular based on one or more of the following conditions: a time elapsed since the start of an OOC event is larger than a time threshold; a distance travelled by the UE 101 since the start of an OOC event is larger than a distance threshold; the UE 101 does not operate in the first mode with a probability defined by the network entity 131; and/or a load of the resources allocated for the first mode is larger than a predefined threshold.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labelling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A user equipment (UE), comprising:
    a communication interface configured to perform communication with one or more additional UEs using one or more of a plurality of resources in a mobile communication network;
    a memory configured to store a plurality of operation profiles; and
    processing circuitry configured to:
        operate the UE in a first mode, wherein the first mode is a scheduled resource allocation mode;
        determine a first condition relating to an out of coverage (OOC) event of the UE is met, wherein the first condition being met corresponds to the UE being out of coverage;
        after determining the first condition is met, continue to operate the UE in the first mode according to one of the plurality of operation profiles until determining a second condition is met based on a time elapsed since the OOC event being larger than a time threshold; and
        in response to determining the second condition is met, switch the UE to a second mode, wherein the second mode is an autonomous resource selection mode or an idle mode.

2. The UE of claim 1, wherein the plurality of operation profiles comprises at least one operation profile configured to be used in an occurrence of an unexpected OOC event.

3. The UE of claim 2, wherein, according to the at least one operation profile configured to be used in the occurrence of the unexpected OOC event, the processing circuitry is further configured to operate the UE in the first mode by using active semi-persistent schedule (SPS) configurations and/or allocated resources for periodic, aperiodic, and/or single transmissions, until the second condition is met.

4. The UE of claim 1, wherein the plurality of operation profiles comprises at least one operation profile associated with an expected OOC event.

5. The UE of claim 4, wherein, according to the at least one operation profile associated with the expected OOC event, the processing circuitry is further configured to operate the UE in the first mode, until the second condition is met, by using active semi-persistent schedule (SPS) configurations and/or allocated resources for periodic transmissions, by selecting one or more of a plurality of resources assigned by a network entity, and/or by using a one-shot schedule provided by the network entity.

6. The UE of claim 1, wherein the second mode is the autonomous resource selection mode, and wherein the processing circuitry is further configured to operate the first mode in parallel with the second mode, in response to the OOC event until the second condition is met, by using the first mode for periodic transmissions and the second mode for aperiodic transmissions.

7. The UE of claim 6, wherein the communication interface is further configured to sense a load of resources for the second mode, and wherein the processing circuitry is further configured to replace a transmission on resources allocated for the first mode with a high-priority transmission of the second mode, in case the load of the resources for the second mode is larger than a load threshold for the second mode.

8. The UE of claim 1, wherein the second condition is met further based on one:
    a distance traveled since the OOC event is larger than a distance threshold;
    the UE not operating in the first mode with a probability defined by a network entity of the communication network; and/or
    a load of the resources allocated for the first mode being larger than a predefined threshold.

9. The UE of claim 1, wherein the communication interface is further configured to, in response to the OOC event, sense a load of the resources, and
    wherein the processing circuitry is further configured to:
        record information about times at which the sensed load is larger than a load threshold, information about locations at which the sensed load is larger than a load threshold, and/or context information of the UE; and
        provide the recorded information to a network entity of the communication network.

10. The UE of claim 1, wherein the second mode is the autonomous resource selection mode, and wherein the communication interface is further configured to, in response to the OOC event, use downlink resources in the second mode.

11. The UE of claim 1, wherein the second mode is the autonomous resource selection mode, and wherein, in the second mode, the communication interface is further configured to transmit, to other UEs, information about a number of next transmissions of the same type to reserve the same selected resources for the number of times on the communication interface.

12. The UE of claim 11, wherein, in the second mode, the communication interface is further configured to:
    transmit, based on the number of next transmissions being smaller than a threshold value, the information about the number of next transmissions to other UEs, the threshold value being provided by a network entity of the communication network; or
    transmit, based on the number of next transmissions being larger than the threshold value, a random number.

13. A method of operating a user equipment (UE), the method comprising:
    performing communication with one or more additional UEs using one or more of a plurality of resources in a communication network;
    storing, in a memory of the UE, a plurality of operation profiles
    operating the UE in a first mode, wherein the first mode is a scheduled resource allocation mode;
    determining a first condition relating to an out of coverage (OOC) event of the UE is met, wherein the first condition being met corresponds to the UE being out of coverage;
    after determining the first condition is met, continuing to operate the UE in the first mode according to one of the plurality of operation profiles until determining a second condition is met based on a time elapsed since the OOC event being larger than a time threshold; and
    in response to determining the second condition is met, switching the UE to a second mode, wherein the second mode is an autonomous resource selection mode or an idle mode.

14. A network entity for managing communication resources in a communication network, wherein the network entity comprises:
    processing circuitry;
    a memory configured to store a plurality of operation profiles; and
    a communication interface configured to:
        communicate with a user equipment (UE), configured to be operated in a first mode and in a second mode, wherein the first mode is a scheduled resource allocation mode and the second mode is an autonomous resource selection mode or an idle mode;
        provide the plurality of operation profiles to the UE; and
        provide the UE with information about when to switch to the second mode, wherein the information includes a time threshold which facilitates the UE continuing to operate in the first mode according to one of the plurality of operation profiles until a time elapsed since an out of coverage (OOC) event is larger than the time threshold and switching to the second mode thereafter.

15. The network entity of claim 14, wherein the plurality of operation profiles comprises at least one operation profile configured to be used in an occurrence of an unexpected OOC event.

16. The network entity of claim 15, wherein the at least one operation profile configured to be used in the occurrence of the unexpected OOC event provides for the UE to operate in the first mode by using active semi-persistent schedule configurations and allocated resources for periodic, aperiodic, and/or single transmissions, until the time elapsed since the OOC event is larger than the time threshold.

17. The network entity of claim 14, wherein the plurality of operation profiles comprises at least one operation profile associated with an expected OOC event.

18. The network entity of claim 17, wherein the at least one operation profile associated with the expected OOC event is configured to provide for the UE to operate in the first mode, until the time elapsed since the OOC event is larger than the time threshold, by using active semi-persistent schedule configurations and/or allocated resources for periodic transmissions, by selecting one or more of a plurality of resources assigned by the network entity to be used during the expected OOC event, and/or by using a one-shot schedule provided by the network entity.

19. The network entity of claim 17, wherein the network entity is further configured to generate the at least one operation profile associated with the expected OOC event based on information provided by another UE having experienced the expected OOC event.

20. The network entity of claim 14, wherein the information about when to switch to the second mode further includes network a distance threshold and/or a probability.

21. The network entity of claim 14, wherein the network entity is further configured to determine, based on information provided by another UE having experienced the expected OOC event, a size of resource pools to be used by the UE in the first mode and/or the second mode.

22. The network entity of claim 21, wherein the network entity is further configured to map the resource pools to be used by the UE in the first mode and/or the second mode to moving zones.

23. The network entity of claim 14, wherein the network entity is further configured to allocate downlink resources to be used by the UE in the first mode and/or the second mode.

24. A method for operating a network entity for managing communication resources in a communication network, the method comprising:
    communicating, by the network entity, with a user equipment (UE) configured to be operated in a first mode and in a second mode, wherein the first mode is a scheduled resource allocation mode and the second mode is an autonomous resource selection mode or an idle mode;
    providing, by the network entity, a plurality of operation profiles to the UE; and
    providing, by the network entity, the UE with information about when to switch to the second mode, wherein the information includes a time threshold which facilitates the UE continuing to operate in the first mode according to one of the plurality of operation profiles until a time elapsed since an out of coverage (OOC) event is larger than the time threshold and switching to the second mode thereafter.

25. A non-transitory processor readable medium having stored thereon processor executable code configured to, when executed on a computer or a processor, perform the method of claim 13.

26. A non-transitory processor readable medium having stored thereon processor executable code configured to, when executed on a computer or a processor, perform the method of claim 24.

* * * * *

UNITED STATES PATENT AND TRADEMARK OFFICE
CERTIFICATE OF CORRECTION

PATENT NO. : 11,647,483 B2
APPLICATION NO. : 17/022751
DATED : May 9, 2023
INVENTOR(S) : Sahin et al.

It is certified that error appears in the above-identified patent and that said Letters Patent is hereby corrected as shown below:

In the Claims

Claim 8: Column 18, Line 42: "further based on one:" should read -- further based on: --.

Claim 14: Column 19, Line 43: "communicate with a user equipment (UE), configured" should read -- communicate with a user equipment (UE) configured --.

Claim 20: Column 20, Line 25: "includes network a distance threshold and/or a probability." should read -- includes a distance threshold and/or a probability. --.

Signed and Sealed this
Twenty-ninth Day of August, 2023

Katherine Kelly Vidal
*Director of the United States Patent and Trademark Office*